(12) United States Patent
Schlossnikl et al.

(10) Patent No.: US 6,177,035 B1
(45) Date of Patent: Jan. 23, 2001

(54) METHOD FOR PRODUCING CELLULOSE SHAPED BODIES

(75) Inventors: Christian Schlossnikl; Siegfried Ambrosch; Heinrich Firgo, all of Vöcklabruck; Peter Gspaltl, Grambach, all of (AT)

(73) Assignee: Lenzing Aktiengesellschaft, Lenzing (AT)

(*) Notice: Under 35 U.S.C. 154(b), the term of this patent shall be extended for 0 days.

(21) Appl. No.: 09/332,715

(22) Filed: Jun. 14, 1999

Related U.S. Application Data

(63) Continuation-in-part of application No. PCT/AT98/00108, filed on Apr. 24, 1998.

(30) Foreign Application Priority Data

Apr. 25, 1997 (AT) .......................................... 705/97

(51) Int. Cl.[7] .................................................. B29C 67/20
(52) U.S. Cl. ...................... 264/41; 264/187; 264/210.4; 264/211.13; 264/233
(58) Field of Search .......................... 264/41, 187, 210.4, 264/211.13, 233

(56) References Cited

U.S. PATENT DOCUMENTS

| | | |
|---|---|---|
| 2,179,181 | 11/1939 | Graenacher et al. . |
| 4,144,080 | 3/1979 | McCorsley, III . |
| 4,246,221 | 1/1981 | McCorsley, III . |
| 4,354,938 | 10/1982 | Walch et al. . |
| 5,330,567 | 7/1994 | Zikeli et al. . |
| 5,417,909 | 5/1995 | Michels et al. . |
| 5,607,639 | 3/1997 | Zileki et al. . |
| 5,658,524 * | 8/1997 | Portnoy et al. ...................... 264/559 |

FOREIGN PATENT DOCUMENTS

| | | |
|---|---|---|
| 1171615 | 7/1984 | (CA) . |
| 1272527 | 7/1968 | (DE) . |
| 2830685 | 2/1979 | (DE) . |
| 2844163 | 3/1979 | (DE) . |
| 195 15 137 A1 | * 10/1996 | (DE) . |
| 0042517 | 4/1981 | (EP) . |
| 0356419 | 2/1990 | (EP) . |
| 0494851 | 9/1992 | (EP) . |
| 0574870 | 6/1993 | (EP) . |
| 0807460 | 4/1997 | (EP) . |
| 9313670 | 7/1993 | (WO) . |
| 9507811 | 3/1995 | (WO) . |
| 9535340 | 12/1995 | (WO) . |
| 9634037 | 10/1996 | (WO) . |
| 9724215 | 7/1997 | (WO) . |
| 9737392 | 10/1997 | (WO) . |

OTHER PUBLICATIONS

E. Staude, "Membranes and Membrane Processes", *VCH Verlagsgesellschaft mBH*, 1992, pp. 18–19.

H. Pfeiffer et al., Dickenschwankungen minimieren, *Kunststoffe* 86 (1996) 8, pp. 1132–1134.

* cited by examiner

*Primary Examiner*—Leo B. Tentoni
(74) *Attorney, Agent, or Firm*—Baker Botts L.L.P.

(57) ABSTRACT

The invention relates to a process for the manufacture of cellulosic flat films and of cellulosic membranes in the form of flat membranes whereby a solution of cellulose in an aqueous tertiary amine oxide is extruded by means of an extrusion nozzle, which has an extrusion gap, whereby the solution is shaped in the form of a film and the solution is led into a precipitation bath via an air gap and is characterized in that an extrusion nozzle is used which has an extrusion gap with a minimum length of 40 cm.

17 Claims, No Drawings

METHOD FOR PRODUCING CELLULOSE SHAPED BODIES

SPECIFICATION

This application is a continuation-in-part of PCT application PCT/AT98/00108 filed on Apr. 24, 1998 which is incorporated by reference herein.

BACKGROUND OF THE INVENTION

The present invention deals with a process for the manufacture of cellulosic moulded bodies, in particular cellulosic flat films and cellulosic membranes in the form of flat membranes whereby a solution of cellulose in an aqueous tertiary amine oxide is extruded by means of an extrusion nozzle, which has an extrusion gap, whereby the solution is formed in the shape of a film and said solution is led via an air gap into a precipitation bath.

From U.S. Pat. No. 2,179,181 it is known that tertiary amine oxides have the ability to dissolve cellulose and that cellulosic moulded bodies such as fibres can be won from these solutions as a result of precipitation. A process for the production of solutions of this kind is for example known from EP-A-0 356 419. According to this publication first of all a suspension of cellulose is prepared in an aqueous tertiary amine oxide. The amine oxide contains up to 40 weight % water. The aqueous cellulose suspension is heated and whilst subjected to a reduction in pressure water is drawn off until such time as the cellulose dissolves.

From DE-A-28 44 163 it is known for the production of cellulose fibres that an air passage respectively air gap is provided between the spinning nozzle and precipitation bath to achieve drawing at the nozzle. This nozzle drawing is necessary since the stretching of the filaments is made more difficult after the contact of the moulded spinning solution with the aqueous precipitation bath. The fibre structure set in the air gap is fixed in the precipitation bath.

A process for the production of cellulosic threads is, furthermore, known from DE-A-28 30 685 whereby a solution of cellulose is formed to filaments in a tertiary amine oxide in a warm condition, the filaments are cooled down with air and finally introduced to a precipitation bath to precipitate the dissolved cellulose. The surface of said spun threads is, furthermore, moistened with water to reduce their tendency to stick to neighboring threads.

A device and a process for the production of seamless tubular films is known from WO 93/13670. According to this well-known process the cellulose solution is formed to a tube by means of an extrusion nozzle with a ring-shaped extrusion gap which is drawn over a cylindrical mandrel and introduced to the precipitation bath. So that the extruded tube does not remain sticking to the surface of the mandrel, its surface is covered with a film of water so that the inside of the tube coagulates and glides across the cylindrical mandrel. The tubular films obtained have wet strengths of about 10 to 30 $N/mm^2$.

WO 95/07811 also describes a device and a process for the production of cellulosic tubular films.

WO 95/35340 describes a blowing process for the production of oriented cellulosic films whereby the cellulose solution is extruded downwards into a precipitation bath via a film blowing nozzle and an air gap. It is mentioned that stretching can be achieved transverse to the transport direction of the blown film via the gas pressure in the inside of the blown film and that the ratio of mechanical longitudinal to transverse properties can be set.

From EP-A - 0 042 517 the production of dialysis membranes is known by extruding the cellulose solution using nozzles with a length of 18 cm.

From DE-A-195 15 137 it is known that when producing cellulosic flat films using grooved nozzles the extruded film undergoes considerable width shrinkage in the air gap. This is undesirable and leads to significant fluctuations in film thickness of up to 150% apart from an insufficient film width. For this reason, for the production of flat films DE-A - 195 15 137 suggests first of all producing tubular films using a ring nozzle which are then cut to flat films. A special film blowing device is used to produce the tubular films with which the extruded tube is stretched in the air gap both in the draw-off direction and in the transverse direction, This happens as a result of gas pressure effective in the inside of the tube which extends the tube. One disadvantage of this process lies in the complicated design of the device to be used.

Moreover, on the other hand, the expert in the field of the extrusion of thermoplastic polymers, such as polyethylene or polypropylene, knows that films with a much better distribution of thickness transverse to the direction of extrusion can be achieved with flat nozzles rather than with round nozzles.

With cellulosic membranes particularly in the form of flat membranes, i.e. membranes from a flat film, the permeability of the membranes is an important property. To solve certain separation tasks it is important to select membranes with the optimum permeability, pore size and pore structure for the respective separation task.

Dialysis membranes made of regenerated cellulose in the form of flat films, tubular films or hollow threads have been known for some time whereby the regeneration of the cellulose can take place by means of the cuoxam-process, the viscose process or by means of the hydrolysis of cellulose acetate. Depending upon the process used and the process conditions one obtains membranes with different dialysis properties.

U.S. Pat. No. 4,354,938 describes for example a process for the production of dialysis membranes according to the viscose process, in which a tubular moulded membrane is stretched in the transverse direction by between 40 and 120% by blowing up with air before drying, which leads to a membrane with a regular orientation in the longitudinal and transverse direction. When transferring the dried membranes in the wet state the membranes thus produced undergo a shrinkage in the longitudinal and transverse direction of 0.5–10%. The ultrafiltration values lie in the range of between 2.5 $ml/m^2$.h.mm Hg and 5.2 $ml/m^2$.h.mm Hg at a wet thickness of 184 $\mu m$ to 45 $\mu m$.

In "membranes and membrane processes" by E. Staude, 1992, VCH Verlagsges.m.b.H. on page 19 it is described that the biaxial stretching of finished cellophane membranes lead to the enlargement of the pores, monoaxial stretching on the other hand leads to a reduction in the effective pore diameter.

However, the viscose process only offers limited possibilities to set membrane properties in a well aimed manner. Moreover, the recovery of the chemicals which accumulate in this process such as sodium sulphate and carbon bisulphide etc. is very expensive.

SUMMARY OF THE INVENTION

It is the task of the present invention to provide a process for the production of cellulosic flat films by the extrusion of a heated solution of cellulose in a tertiary amine oxide which does not have the disadvantages named above. In particular the difficult step to produce tubular films is to be overcome.

Moreover, it is the object of the invention to provide a process for the production of cellulosic membranes in the form of flat membranes by means of which membranes with a permeability which is optimized for the individual separation task to be accomplished can be achieved.

The process according to the invention to produce cellulosic flat films and cellulosic membranes in the form of flat membranes, whereby a solution of cellulose is extruded in an aqueous tertiary amine oxide by means of an extrusion nozzle, which has an extrusion gap, whereby the solution is formed in the shape of a film and the solution is led via an air gap into a precipitation bath, is characterised in that an extrusion nozzle is used which has an extrusion gap with a length of at least 40 cm. This means that the extruded material, i.e. the solution formed in the shape of a film, has width of at least 40 cm directly when it emerges from the extrusion gap.

Surprisingly it was shown that when extending the extrusion gap to a value of at least 40 cm the film obtained shrinks by less than 20% in width during the subsequent process steps. This low shrinkage is not even exceeded when stretching the film by up to three times in the longitudinal direction.

Thus the disadvantages described in DE-A- 195 15 137 when producing flat films using a flat nozzle can be overcome when the extrusion gap is at least 40 cm long.

Preferably an extrusion nozzle is used which has an extrusion gap with a length of at least 60 cm.

One advantageous embodiment of the process in accordance with the invention lies in the fact that the solution shaped in the form of a film in the air gap is drawn off in the extrusion direction with a speed which corresponds to 0.2 to 20 times the speed with which the solution shaped in the form of a film emerges from the extrusion gap.

Thus the speed of drawing off the solution can be smaller than the extrusion speed of the solution, e.g. in a ratio of 0.2:1 to 0.9:1 or alternatively can be bigger than the extrusion speed of the solution, e.g. in a ratio of 2:1 to 20:1, preferably up to 10:1. However the solution shaped in the form of a film can also be drawn off with the same speed as the speed with which it is extruded.

One further advantageous embodiment of the process in accordance with the invention is characterised in that the solution shaped in the form of a film is stretched in the air gap in the extrusion direction and/or transverse to the extrusion direction.

Moreover the solution shaped in the form of a film can be stretched in the precipitation bath transverse to the extrusion direction.

One other embodiment lies in guiding the flat film out of the precipitation bath and then stretching it transverse to the extrusion direction.

The stretching of the solution shaped in the form of a film in the air gap transverse to the extrusion direction can be effected with the help of driven conveyor belts which range on both sides of the nozzle from the lower side of the nozzle to the surface of the precipitation bath whereby they are constantly moistened with precipitating agent and adhesion to the shaped solution is avoided. The solution is held between two conveyor belts at both edges on the side directly after emerging from the extrusion nozzle. The conveyor belts are inclined to the surface of the precipitation bath, they transport the shaped solution through the air gap into the precipitation bath and thereby stretch the shaped solution. The extent of stretching naturally depends on the angle which the conveyor belts encircle with the surface of the precipitation bath.

In an analogous manner the film can also be stretched in the precipitation bath or after the precipitation bath transverse to the transport direction. Other mechanisms common in the plastics industry are suitable for this stretching such as for example those used for the production of biaxially oriented polypropylene.

One part of the loss in width as a result of the transverse shrinkage of the film already happens in the air gap between emerging from the nozzle and the surface of the precipitation bath and is influenced by the length of the air gap.

The air gap in the process in accordance with the invention is suitably set at a length of a maximum of 15 cm, and a maximum of 3 cm in particular.

The temperature of the cellulose solution during extrusion lies preferably in the range of 80° C. and 120° C. in the process in accordance with the invention, and in particular in the range of 85° C. and 95° C.

One further advantageous embodiment of the process in accordance with the invention is characterised in that an extrusion nozzle is used which has an extrusion gap with a width in the range of 50 $\mu$m and 2000 $\mu$m. The extrusion die preferably includes an extrusion section. The cellulose solution flows out from the extrusion section into the extrusion gap. The length of the extrusion section is preferably greater than 1 mm, most preferably from about 5 mm to about 20 mm.

Moreover, it appeared that advantageous results can be achieved with the process in accordance with the invention particularly when distribution systems are used to distribute the cellulose solution in front of the extrusion nozzle, such as those common in the plastics industry, in particularly a distribution system of the "coat hanger" type. Distribution systems of this kind are for example known from "Plastics" 86 (1996), pages 1132 ff (Carl Hanser Publishing House, Munich).

The process in accordance with the invention is further characterised by the fact that flat films can be produced with a balanced ratio of mechanical longitudinal and transverse properties. Moreover, films can be produced with high strengths in the longitudinal direction even with only slightly reduced transverse properties.

It has proved to be useful to lead the film out of the precipitation bath and wash it whereby the film is at the same time prevented from shrinking if necessary.

N-methylmorpholine-N-oxide (NMMO) has particularly proved its worth as a tertiary amine oxide.

Moreover, it has proved suitable to dry the film after washing and prevent it from shrinking at the same time. Tumble drying, hot air drying, drying using infra-red rays and microwaves and suction drum drying are particularly well suited as drying processes. When using drum drying the film can be prevented from shrinking quite simply by attaching revolving belts. Surprisingly it appeared from this that the strength values of the film can be increased by a tension which occurs during the drying process.

The properties of the flat films manufactured in accordance with the invention can be adapted to the respective use by subsequent coating. For example it is possible to make the film hydrophobic, to influence the electrostatic behavior and the dye affinity, to change the abrasion resistance and make the film sealable.

The advantages described above of the process in accordance with the invention apply in particular to a production in accordance with the invention of cellulosic membranes in the form of flat membranes.

In this respect the permeability of the membrane and thus also its ultrafiltration rate (UFR) can be influenced in particular by the selection of the speed at which the film-like moulded solution is drawn off in the air gap. In this respect it is shown that a lower draw-off speed increases the permeability and thus also the ultrafiltration rate of the membrane. By contrast the transverse stretching of the film after entering the precipitation bath increases the permeability of the membrane. Thus basic membrane properties can be controlled by the selection of draw-off speed and the transverse stretching of the film.

The cellulosic flat film produced in accordance with the invention is bio-degradable and compostable and is particularly well suited to use as a packing material for foodstuffs and other products, as a material for rubbish bags and carrier bags, as a film for agriculture, as a film for diapers, as a substrate for compounds, as an office film, as a household film or as a membrane, and to separate substance mixtures.

DETAILED DESCRIPTION OF THE PREFERRED EMBODIMENTS

With the examples which follow preferred embodiments of the invention are described in greater detail. The cellulose solutions used were produced according to the processes described in EP-A- 0 356 419. In all of the examples the films were washed following the precipitation of the cellulose and treated with glycerine (glycerine content in the dried film: about 15 wt. %) and then provided nothing is indicated to the contrary dried in a tenter frame in which the films were secured in the longitudinal and transverse direction. The properties indicated in the examples were determined on the dried films whereby the strength (longitudinal and transverse) and the longitudinal and transverse elongation were determined according to DIN 53457.

The ultrafiltration rate given in the examples is defined as the per time unit of the volume of the permeate passing through the membrane wall relative to the membrane area and the test pressure.

$$UFR = \frac{V}{t.A.P} \frac{ml}{h.m^2.mmHg}$$

V=volume of liquid (permeate) [ml]
t=time [h]
A=membrane area [m$^2$]
p=test pressure [mm Hg]

The values for diffuse permeabilities are determined by the increase of the straight line arrived at by plotting $\ln(c_t/c_o)$ against time.

$$\ln\frac{c_t}{c_0} = -\frac{A}{V} \cdot P_{diff} \cdot t$$

$c_o$=starting concentration
$c_t$=concentration at time t
A=membrane area [cm$^2$]
V=dialysis volume [cm$^3$]
$P_{diff}$=diffuse permeability [cm/min]
t=time [min]

To directly compare the different membranes all the permeabilities were converted to a wet thickness of 75 μm, i.e. the corresponding times for reaching the balanced state were standardized to this thickness. For example if with a membrane with a thickness of 200 μm, the balanced state of NaCl-dialysis was reached after 100 hours, then this corresponds to a time of 100×75/200=37.5 hours for a membrane with a thickness of 75 μm.

EXAMPLE 1

A cellulose solution with a temperature of 85° C., containing 15.5 wt. % cellulose, 74.6 wt. % NMMO and 9.9 wt. % water, was extruded with a throughput of 37.8 kg/h by means of a flat nozzle with an extrusion gap with a length of 40 cm and a width of 300 μm, through an air gap of 2 cm vertically downwards into a precipitation bath, comprising 80 wt. % water and 20 wt. % NMMO.

The cellulose solution shaped as a flat film emerged from the nozzle at a speed of 4.2 m/min and was drawn off at the same speed. This means that the flat film was not stretched in the longitudinal direction in the air gap.

The flat film obtained had the following properties:

| | |
|---|---|
| Width: | 37.0 cm |
| Thickness: | 67.0 μm |
| Tenacity (longitudinal direction): | 224.1 N/mm$^2$ |
| Tenacity (transverse direction): | 165.1 N/mm$^2$ |
| Elongation in longitudinal direction: | 25.6% |
| Elongation in transverse direction: | 54.3% |
| UFR-water: | 5.5 ml/h · m$^2$ · mm Hg |
| $P_{diff}$ NaCl | 4.2*10$^{-3}$ cm/min |
| $P_{diff}$ NaOH | 5.2*10$^{-3}$ cm/min |

This example shows that the film, which had a width of 20 cm directly after extrusion, shrunk by only 3.0 cm. This is a width shrinkage of only 7.5%.

EXAMPLE 2

The procedure was the same as in example 1 whereby the cellulose solution used had a temperature of 110° C. and comprised 13.8 wt. % cellulose, 76.4 wt. % NMMO and 9.8 wt. % water, the extrusion gap of the flat nozzle used had a width of 500 μm, the throughput equalled 75.6 kg/h, the air gap was 1 cm and the precipitation bath comprised 98 wt. % water and 2 wt. % NMMO.

The extrusion speed equalled 5.0 m/min and the film was drawn off only with 90% of the extrusion-speed:

| | |
|---|---|
| Width: | 37.0 cm |
| Thickness: | 69.0 μm |
| Tenacity (longitudinal direction): | 229.0 N/mm$^2$ |
| Tenacity (transverse direction): | 148.9 N/mm$^2$ |
| Longitudinal elongation: | 19.4% |
| Transverse elongation: | 4.4% |
| UFR-water: | 6.1 ml/h · m$^2$ · mm Hg |
| $P_{diff}$ NaCl | 4.8*10$^{-3}$ cm/min |
| $P_{diff}$ NaOH | 5.9*10$^{-3}$ cm/min |

This example shows that the film, which had a width of 40 cm directly after extrusion, shrunk by only 3.0 cm. This represents a width shrinkage of only 7.5%.

EXAMPLE 3

The procedure was the same as in example 1 whereby, however, the cellulose solution used comprised 15 wt. % cellulose, 74.6 wt. % NMMO and 10.4 wt. % water, the extrusion gap of the flat nozzle used had a width of 300 μm, the throughput equalled 37.8 kg/h and the air gap was 5 cm.

The extrusion speed equalled 4.2 m/min and the film was merely drawn off with 40% of the extrusion speed.

The flat film obtained had the following properties:

| | |
|---|---|
| Width: | 35.0 cm |
| Thickness: | 82.0 μm |
| Tenacity (in longitudinal direction): | 171.0 N/mm² |
| Tenacity (transverse direction): | 121.8 N/mm² |
| Elongation in longitudinal direction: | 42.9% |
| Elongation in transverse direction: | 74.8% |
| UFR-water: | 7.4 ml/h · m² · mm Hg |
| $P_{diff}$ NaCl | 6.5*10⁻³ cm/min |
| $P_{diff}$ NaOH | 7.0*10⁻³ cm/min |

This example shows that the film, which had a width of 40 cm directly after extrusion, shrunk only by 5 cm. This is a width shrinkage of only 12.5%.

EXAMPLE 4

The procedure was the same as in example 1 whereby, however, the cellulose solution used comprised 14.6 wt. % cellulose, 75.6 wt. % NMMO and 9.8 wt. % water, the extrusion gap of the flat nozzle used had a width of 1000 μm, the throughput equalled 113.4 kg/h and the air gap was 2 cm.

The extrusion speed equalled 3.8 m/min and the film was drawn off at three times the extrusion speed.

The film obtained had the following properties:

| | |
|---|---|
| Width: | 35.0 cm |
| Thickness: | 92.0 μm |
| Tenacity (longitudinal direction): | 218.4 N/mm² |
| Tenacity (transverse direction): | 122.5 N/mm² |
| Elongation in longitudinal direction: | 27.1% |
| Elongation in transverse direction: | 87.3% |
| UFR-water: | 3.8 ml/h · m² · mm Hg |
| $P_{diff}$ NaCl | 2.0*10⁻³ cm/min |
| $P_{diff}$ NaOH | 2.6*10⁻³ cm/min |

This example shows that the film, which had a width of 40 cm directly after extrusion, shrunk by only 5.0 cm. This is a width shrinkage of only 12.5%.

EXAMPLE 5

A cellulose solution with a temperature of 85° C., containing 13.0 wt. % cellulose, 77.1 wt. % NMMO and 9.9 wt.% water, was extruded by means of a flat nozzle, which had an extrusion gap with a length of 40 cm and a width of 300 μm, with a throughput of 37.8 kg/h through an air gap of 2 cm vertically downwards into a precipitation bath, comprising 80 wt. % water and 20 wt. % NMMO.

The extrusion speed equalled 4.2 m/min, and the film was drawn off at the same speed. This means that the flat film was not stretched in the longitudinal direction.

The flat film obtained had the following properties:

| | |
|---|---|
| Width: | 36.0 cm |
| Thickness: | 80.0 μm |
| Tenacity (longitudinal direction): | 144.0 N/mm² |
| Tenacity (transverse direction): | 115.9 N/mm² |
| Elongation in longitudinal direction: | 35.5% |
| Elongation in transverse direction: | 26.5% |
| UFR-water: | 5.7 ml/h · m² · mm Hg |
| $P_{diff}$ NaCl | 4.4*10⁻³ cm/min |
| $P_{diff}$ NaOH | 5.1*10⁻³ cm/min |

This example shows that the film, which had a width of 40 cm directly after extrusion, shrunk by only 4.0 cm. This is a width shrinkage of only 10%.

EXAMPLE 6

A cellulose solution with a temperature of 85 ° C., containing 14.2 wt. % cellulose, 76.3 wt. % NMMO and 9.5 wt. % water, was extruded by means of a flat nozzle, which had an extrusion gap with a length of 40 cm and a width of 100 μm, with a throughput of 75.6 kg/h through an air gap of 2 cm vertically downwards into a precipitation bath, comprising 80 wt. % water and 20 wt. % NMMO.

The extrusion speed equalled 25.0 m/min and the film was drawn off at three times the extrusion speed.

The flat film obtained had the following properties:

| | |
|---|---|
| Width: | 33.0 cm |
| Thickness: | 15.0 μm |
| Tenacity (longitudinal direction): | 226.2 N/mm² |
| Tenacity (transverse direction): | 46.3 N/mm² |
| Elongation in longitudinal direction: | 11.3% |
| Elongation in transverse direction: | 35.0% |
| UFR-water: | 2.4 ml/h · m² · mm Hg |
| $P_{diff}$ NaCl | 1.1*10⁻³ cm/min |
| $P_{diff}$ NaOH | 1.4*10⁻³ cm/min |

This example shows that the film, which had a width of 40 cm directly after extrusion, shrunk by only 7.0 cm. This is a width shrinkage of only 17.5%.

EXAMPLE 7

A cellulose solution with a temperature of 85° C., containing 14.1 wt. % cellulose, 75.6 wt. % NMMO and 10.3 wt.% water, was extruded by means of a flat nozzle, which had an extrusion gap with a length of 40 cm and a width of 1000 μm, with a throughput of 75.6 kg/h through an air gap of 5 cm vertically downwards into a precipitation bath comprising 80 wt.% water and 20 wt.% NMMO.

The extrusion speed equalled 2.5 m./min, and the film was drawn off with 2.2 times this speed.

The film obtained had the following properties:

| | |
|---|---|
| Width: | 34.0 cm |
| Thickness: | 135.0 μm |
| Tenacity (longitudinal direction): | 193.9 N/mm² |
| Tenacity (transverse direction): | 130.5 N/mm² |
| Elongation in longitudinal direction: | 39.6% |
| Elongation in transverse direction: | 71.7% |
| UFR-water: | 4.2 ml/h · m² · mm Hg |
| $P_{diff}$ NaCl | 2.1*10⁻³ cm/min |
| $P_{diff}$ NaOH | 3.1*10⁻³ cm/min |

This example shows that the film, which had a width of 40 cm directly after extrusion, shrunk by about only 6 cm. This is a width shrinkage of only 15%.

EXAMPLE 8

A cellulose solution with a temperature of 110° C., containing 14.3 wt. % cellulose, 76.2 wt. % NMMO and 9.5 wt. % water, was extruded by means of a flat nozzle, which had an extrusion gap with a length of 40 cm and a width of 500 μm, with a throughput of 75.6 kg/h through an air gap of 1 cm vertically downwards into a precipitation bath comprising 98 wt. % water and 2 wt. % NMMO.

The extrusion speed equalled 5.0 m/min and the film was drawn off at 2.9 times this speed.

The flat film obtained had the following properties:

| | |
|---|---|
| Width: | 35.0 cm |
| Thickness: | 85.0 μm |
| Tenacity (longitudinal direction): | 222.6 N/mm$^2$ |
| Tenacity (transverse direction): | 117.6 N/mm$^2$ |
| Elongation in longitudinal direction: | 20.9% |
| Elongation in transverse direction: | 32.2% |
| UFR-water: | 3.8 ml/h · m$^2$ · mm Hg |
| $P_{diff}$ NaCl | 1.9*10$^{-3}$ cm/min |
| $P_{diff}$ NaOH | 2.4*10$^{-3}$ cm/min |

This example shows that the film, which had a width of 40 cm directly after extrusion, shrunk by only 5 cm. This is a width shrinkage of only 12.5%.

EXAMPLE 9

A cellulose solution with a temperature of 110° C., containing 14.2 wt. % cellulose, 76.2 wt. % NMMO and 9.6 wt.% water, was extruded by means of a flat nozzle, which had an extrusion gap with a length of 40 cm and a width of 500 μm, with a throughput of 76.5 kg/h through an air gap of 3 cm vertically downwards into a precipitation bath comprising 98 wt. % water and 2 wt. % NMMO.

The extrusion speed equalled 5.0 m/min and the film was drawn off at three times this speed and stretched in the precipitation bath in the direction of its width by 50% (stretching in the transverse direction).

The film obtained had the following properties:

| | |
|---|---|
| Width: | 55.0 cm |
| Thickness: | 33.0 μm |
| Tenacity (longitudinal direction): | 151.3 N/mm$^2$ |
| Tenacity (transverse direction): | 135.6 N/mm$^2$ |
| Elongation in longitudinal direction: | 16.4% |
| Elongation in transverse direction: | 37.3% |
| UFR-water: | 4.7 ml/h · m$^2$ · mm Hg |
| $P_{diff}$ NaCl | 2.4*10$^{-3}$ cm/min |
| $P_{diff}$ NaOH | 2.6*10$^{-3}$ cm/min |

EXAMPLE 10

A cellulose solution with a temperature of 85° C., containing 14.6 wt. % cellulose, 75.9 wt. % NMMO and 9.5 wt. % water, was extruded by means of a flat nozzle, which had an extrusion gap with a length of 40 cm and a width of 300 μm, with a throughput of 37.8 kg/h through an air gap of 3 cm vertically downwards into a precipitation bath, comprising 80 wt. % water and 20 wt. % NMMO.

The extrusion speed equalled 4.2 m/min, and the film was drawn off at the same speed. This means that the flat film was not stretched in the longitudinal direction in the air gap. The film was, however, stretched in the air gap in the direction of the width by 10% (stretching in the transverse direction).

The film obtained had the following properties:

| | |
|---|---|
| Width: | 40.0 cm |
| Thickness: | 95.0 μm |
| Tenacity (longitudinal direction): | 153.4 N/mm$^2$ |
| Tenacity (transverse direction): | 105.2 N/mm$^2$ |
| Elongation in longitudinal direction: | 49.8% |
| Elongation in transverse direction: | 71.7% |
| UFR-water: | 5.2 ml/h · m$^2$ · mm Hg |
| $P_{diff}$ NaCl | 4.0*10$^{-3}$ cm/min |
| $P_{diff}$ NaOH | 4.9*10$^{-3}$ cm/min |

EXAMPLE 11

A cellulose solution with a temperature of 110° C., containing 14.2 wt. % cellulose, 76.2 wt. % NMMO and 9.6 wt.% water, was extruded by means of a flat nozzle, which had an extrusion gap with a length of 40 cm and a width of 500 μm, with a throughput of 76.5 kg/h through an air gap of 1 cm vertically downwards into a precipitation bath comprising 98 wt. % water and 2 wt. % NMMO.

The extrusion speed equalled 5.0 m/min and the film was drawn off at the same speed.

The film obtained had the following properties:

| | |
|---|---|
| Width: | 37.0 cm |
| Thickness: | 85.0 μm |
| Tenacity (longitudinal direction): | 144.7 N/mm$^2$ |
| Tenacity (transverse direction): | 95.0 N/mm$^2$ |
| Elongation in longitudinal direction: | 24.9% |
| Elongation in transverse direction: | 31.4% |
| UFR-water: | 5.9 ml/h · m$^2$ · mm Hg |
| $P_{diff}$ NaCl | 4.5*10$^{-3}$ cm/min |
| $P_{diff}$ NaOH | 5.5*10$^{-3}$ cm/min |

This example shows that the film, which had a width of 40 cm directly after extrusion, shrunk by only 3.0 cm. This is a width shrinkage of only 7.5%.

EXAMPLE 12

The procedure was the same as in example 11 whereby the cellulose solution had a temperature of 95° C.

The film obtained had the following properties:

| | |
|---|---|
| Width: | 37.0 cm |
| Thickness: | 85.0 μm |
| Tenacity (longitudinal direction): | 171.2 N/mm$^2$ |
| Tenacity (transverse direction): | 117.0 N/mm$^2$ |
| Elongation in longitudinal direction: | 34.7% |
| Elongation in transverse direction: | 77.7% |
| UFR-water: | 5.8 ml/h · m$^2$ · mm Hg |
| $P_{diff}$ NaCl | 4.5*10$^{-3}$ cm/min |
| $P_{diff}$ NaOH | 5.4*10$^{-3}$ cm/min |

This example shows that the film, which had a width of 40 cm directly after extrusion, shrunk by only 3.0 cm. This is a width shrinkage of only 7.5%.

EXAMPLE 13

The procedure was the same as in example 1 whereby the temperature of the cellulose solution used was 110° C. and contained 13.8 wt. % cellulose, 76.4 wt. % NMMO and 9.8 wt. % water, the extrusion gap of the flat nozzle used had a length of 40 cm and a width of 500 μm and the throughput was 75.6 kg/h and the precipitation bath comprised 98 wt. % water and 2 wt. % NMMO.

The extrusion speed equalled 5.0 m/min and the film was drawn off at the same speed. After the precipitation bath the film was then stretched in the direction of its width by 54% (stretching in the transverse direction).

The film obtained had the following properties:

| | |
|---|---|
| Width: | 56.0 cm |
| Thickness: | 68.0 μm |
| Tenacity (longitudinal direction): | 132.7 N/mm$^2$ |
| Tenacity (transverse direction): | 157.0 N/mm$^2$ |
| Elongation in longitudinal direction: | 40.9% |
| Elongation in transverse direction: | 36.1% |
| UFR-water: | 6.0 ml/h · m$^2$ · mm Hg |
| $P_{diff}$ NaCl | 4.6*10$^{-3}$ cm/min |
| $P_{diff}$ NaOH | 5.4*10$^{-3}$ cm/min |

EXAMPLE 14

The procedure was the same as in example 13 whereby, however, the film was drawn off after extrusion at three times the extrusion speed.

The film obtained had the following properties:

| | |
|---|---|
| Width: | 55.0 cm |
| Thickness: | 28.0 μm |
| Tenacity (longitudinal direction): | 159.1 N/mm$^2$ |
| Tenacity (transverse direction): | 127.1 N/mm$^2$ |
| Elongation in longitudinal direction: | 29.1% |
| Elongation in transverse direction: | 74.8% |
| UFR-water: | 5.0 ml/h · m$^2$ · mm Hg |
| $P_{diff}$ NaCl | 2.5*10$^{-3}$ cm/min |
| $P_{diff}$ NaOH | 2.8*10$^{-3}$ cm/min |

EXAMPLE 15

A cellulose solution with a temperature of 85 ° C., containing 14.2 wt. % cellulose, 76.3 wt. % NMMO and 9.5 wt.% water, was extruded by means of a flat nozzle, which had an extrusion gap with a length of 40 cm and a width of 500 μm, with a throughput of 75.6 kg/h through an air gap of 1 cm vertically downwards into a precipitation bath comprising 98 wt. % water and 2 wt.% NMMO.

The extrusion speed equalled 5.0 m/min and the film was drawn off at the same speed. After the precipitation bath the film was then stretched in the direction of its width by 100% (stretching in the transverse direction).

The film obtained had the following properties:

| | |
|---|---|
| Width: | 74.0 cm |
| Thickness: | 45.0 μm |
| Tenacity (longitudinal direction): | 119.1 N/mm$^2$ |
| Tenacity (transverse direction): | 184.6 N/mm$^2$ |
| Elongation in longitudinal direction: | 42.0% |
| Elongation in transverse direction: | 32.0% |
| UFR-water: | 6.1 ml/h · m$^2$ · mm Hg |
| $P_{diff}$ NaCl | 4.8*10$^{-3}$ cm/min |
| $P_{diff}$ NaOH | 5.7*10$^{-3}$ cm/min |

EXAMPLE 16

A cellulose solution with a temperature of 110° C., containing 14.2 wt. % cellulose, 76.3 wt. % NMMO and 9.5 wt.% water, was extruded by means of a flat nozzle, which had an extrusion gap with a length of 40 cm and a width of 500 μm, with a throughput of 75.6 kg/h through an air gap of 1 cm vertically downwards into a precipitation bath comprising 98 wt. % water and 2 wt. % NMMO.

The extrusion speed equalled 5.0 m/min, and the film was drawn off at three times this speed. After the precipitation bath the film was stretched in the direction of its width by 100% (stretching in the transverse direction).

The film obtained had the following properties:

| | |
|---|---|
| Width: | 72.0 cm |
| Thickness: | 17.0 μm |
| Tenacity (longitudinal direction): | 170.4 N/mm$^2$ |
| Tenacity (transverse direction): | 152.6 N/mm$^2$ |
| Elongation in longitudinal direction: | 26.9% |
| Elongation in transverse direction: | 44.7% |
| UFR-water: | 5.1 ml/h · m$^2$ · mm Hg |
| $P_{diff}$ NaCl | 2.9*10$^{-3}$ cm/min |
| $P_{diff}$ NaOH | 3.1*10$^{-3}$ cm/min |

EXAMPLE 17

A cellulose solution with a temperature of 85 ° C., containing 14.1 wt. % cellulose, 75.6 wt. % NMMO and 10.3 wt. % water, was extruded by means of a flat nozzle, which had an extrusion gap with a length of 40 cm and a width of 1000 μm, with a throughput of 189.0 kg/h through an air gap of 3 cm vertically downwards into a precipitation bath comprising 80 wt.% water and 20 wt.% NMMO.

The cellulose solution shaped in the form of a flat film emerged from the nozzle with an extrusion speed of 6.3 m/min and was drawn off at the same speed. This means that the flat film was not stretched in the longitudinal direction in the air gap.

The film obtained had the following properties:

| | |
|---|---|
| Width: | 37.0 cm |
| Thickness: | 110.0 μm |
| Tenacity (longitudinal direction): | 186.7 N/mm$^2$ |
| Tenacity (transverse direction): | 118.1 N/mm$^2$ |
| Elongation in longitudinal direction: | 32.3% |
| Elongation in transverse direction: | 81.1% |
| UFR-water: | 6.1 ml/h · m$^2$ · mm Hg |
| $P_{diff}$ NaCl | 4.5*10$^{-3}$ cm/min |
| $P_{diff}$ NaOH | 6.6*10$^{-3}$ cm/min |

EXAMPLE 18

A cellulose solution with a temperature of 85 ° C., containing 14.6 wt. % cellulose, 75.9 wt. % NMMO and 9.5 wt. % water, was extruded by means of a flat nozzle, which had an extrusion gap with a length of 40 cm and a width of 300 μm, with a throughput of 37.8 kg/h through an air gap of 2 cm vertically downwards into a precipitation bath comprising 80 wt. % water and 20 wt. % NMMO.

The cellulose solution shaped in the form of a flat film emerged from the nozzle at an extrusion speed of 4.2 m/min and was drawn off at three times this speed.

The film obtained had the following properties:

| | |
|---|---|
| Width: | 36.5 cm |
| Thickness: | 33.3 μm |
| Tenacity (longitudinal direction): | 243.3 N/mm² |
| Tenacity (transverse direction): | 92.3 N/mm² |
| Elongation in longitudinal direction: | 20.5% |
| Elongation in transverse direction: | 113.8% |
| UFR-water: | 3.6 ml/h · m² · mm Hg |
| $P_{diff}$ NaCl | $1.6*10^{-3}$ cm/min |
| $P_{diff}$ NaOH | $2.3*10^{-3}$ cm/min |

EXAMPLE 19

A film was manufactured in the same way as in example 18. This film was dried using a tumble drier whereby it was pressed at the edges by revolving belts onto the drum of the drier and said film was thus prevented from shrinking in the course of drying.

The dried film obtained had the following properties:

| | |
|---|---|
| Width: | 36.5 cm |
| Thickness: | 29.3 μm |
| Tenacity (longitudinal direction): | 321.5 N/mm² |
| Tenacity (transverse direction): | 108.8 N/mm² |
| Elongation in longitudinal direction: | 10.0% |
| Elongation in transverse direction: | 18.2% |

EXAMPLE 20

COMPARISON

A cellulose solution with a temperature of 85° C., containing 14.6 wt. % cellulose, 75.9 wt. % NMMO and 9.5 wt. % water, was extruded by means of a flat nozzle, which had an extrusion gap with a length of 6 cm and a width of 300 μm, with a throughput of 11.4 kg/h through an air gap of 2 cm vertically downwards into a precipitation bath, comprising 80 wt. % water and 20 wt. % NMMO.

The cellulose solution shaped in the form of a flat film emerged from the nozzle at an extrusion speed of 8.3 m/min and was drawn off at the same speed.

The film obtained displayed the following properties:

| | |
|---|---|
| Width: | 4.5 cm |
| Thickness: | 89.0 μm |
| Tenacity (longitudinal direction): | 154.4 N/mm² |
| Elongation in longitudinal direction: | 17.4% |

The width shrinkage equals 25% in this case.

EXAMPLE 21

COMPARISON

The procedure was the same as in example 20 whereby the air gap was set at 5 cm.

The film obtained had the following properties:

| | |
|---|---|
| Width: | 4.0 cm |
| Thickness: | 85.0 μm |
| Tenacity (longitudinal direction): | 126.5 N/mm² |
| Elongation in longitudinal direction: | 27.0% |

In this case the width shrinkage equals 33%.

EXAMPLE 22

A cellulose solution with a temperature of 110° C. containing 14.2 wt. % cellulose, 76.3 wt. % NMMO and 9.5 wt. % water, was extruded by means of a flat nozzle, which had an extrusion gap with a length of 40 cm and a width of 500 μm, with a throughput of 75.6 kg/h through an air gap of 1 cm vertically downwards into a precipitation bath, comprising 98 wt. % water and 2 wt. % NMMO.

The cellulose solution shaped in the form of a film emerged from the nozzle with an extrusion speed of 5.0 m/min and was drawn off at sixteen times this speed.

The film obtained had the following properties:

| | |
|---|---|
| Width: | 19.0 cm |
| Thickness: | 5.0 μm |
| Tenacity (longitudinal direction): | 324.5 N/mm² |
| Tenacity (transverse direction): | 64.2 N/mm² |
| Elongation in longitudinal direction: | 10.8% |
| Elongation in transverse direction: | 63.4% |
| UFR-water: | 1.1 ml/h · m² · mm Hg |
| $P_{diff}$ NaCl | $6.7*10^{-3}$ cm/min |
| $P_{diff}$ NaOH | $9.2*10^{-3}$ cm/min |

EXAMPLE 23

COMPARISON

The procedure was the same as in example 22 whereby the cellulose solution had 14.6 wt. % cellulose, 76.1 wt. % NMMO and 9.3 wt. % water and the flat nozzle had an extrusion gap with a length of 6 cm.

The film obtained had the following properties:

| | |
|---|---|
| Width: | 1.68 cm |
| Thickness: | 5.0 μm |
| Tenacity (longitudinal direction): | 309.8 N/mm² |
| Elongation in longitudinal direction: | 9.1% |

EXAMPLE 24

A cellulose solution with a temperature of 90° C. containing 14.6 wt. % cellulose, 76.1 wt. % NMMO and 9.3 wt. % water, was extruded by means of a flat nozzle, which had an extrusion gap with a length of 40 cm and a width of 300 μm, with a throughput of 37.8 kg/h through an air gap of 2 cm vertically downwards into a precipitation bath, comprising 80 wt. % water and 20 wt. % NMMO.

The extrusion speed of the cellulose solution shaped in the form of a flat film equalled 4.2 m/min and the film was drawn off at the same speed. This means that the film was not stretch in the longitudinal direction.

The film obtained had the following properties:

| | |
|---|---|
| Width: | 37.0 cm |
| Thickness: | 70.0 μm |
| Tenacity (longitudinal direction): | 197.7 N/mm$^2$ |
| Tenacity (transverse direction): | 95.5 N/mm$^2$ |
| Elongation in longitudinal direction: | 52.5% |
| Elongation in transverse direction: | 90.3% |
| UFR-water: | 5.6 ml/h · m$^2$ · mm Hg |
| P$_{diff}$ NaCl | 4.4*10$^{-3}$ cm/min |
| P$_{diff}$ NaOH | 5.3*10$^{-3}$ cm/min |

This example shows that the film, which had a width of 40 cm directly after extrusion, shrunk by only 3.0 cm. This is a width shrinkage of only 7.5%.

EXAMPLE 25

The procedure was the same as with example 24 whereby, however, the air gap had a length of 5 cm.

The film obtained had the following properties:

| | |
|---|---|
| Width: | 35.0 cm |
| Thickness: | 73.0 μm |
| Tenacity (longitudinal direction): | 172.7 N/mm$^2$ |
| Tenacity (transverse direction): | 101.3 N/mm$^2$ |
| Elongation in longitudinal direction: | 33.3% |
| Elongation in transverse direction: | 41.5% |
| UFR-water: | 5.5 ml/h · m$^2$ · mm Hg |
| P$_{diff}$ NaCl | 4.5*10$^{-3}$ cm/min |
| P$_{diff}$ NaOH | 5.2*10$^{-3}$ cm/min |

This example shows that the film, which had a width of 40 cm directly after extrusion, shrunk by 5.0 cm. This is a width shrinkage of 12.5%.

We claim:

1. Process for the manufacture of cellulosic flat films and cellulosic membranes in the form of flat membranes comprising:
providing a solution of cellulose in an aqueous tertiary amine oxide conveying the solution through an extrusion nozzle whereby said solution is shaped in the form of a film, and
conveying the solution through an air gap into a precipitation bath to form one selected from the group consisting of a cellulosic flat film and a cellulosic membrane wherein the extrusion nozzle has an extrusion gap with a length of at least 40 cm.

2. Process according to claim 1 wherein the extrusion nozzle has an extrusion gap with a length of at least 60 cm.

3. Process according to any one of claims 1 or 2 wherein the solution shaped in the form of a film is drawn off in the air gap in the extrusion direction at a speed which corresponds to 0.2 to 20 times the speed at which the solution shaped in the form of a film emerges from the extrusion gap.

4. Process according to any one of claims 1 or 2 wherein the solution shaped in the form of a film is stretched in the air gap transverse to the extrusion direction.

5. Process according to any one of claims 1 or 2 wherein the solution shaped in the form of a film is stretched in the precipitation bath transverse to the extrusion direction.

6. Process according to any one of claims 1 or 2 wherein the film is conveyed out of the precipitation bath and then stretched transverse to the extrusion direction.

7. Process according to any one of claims 1 or 2 wherein the air gap has a maximum length of 15 cm.

8. Process according to claim 7 wherein the air gap has a maximum length of 3 cm.

9. Process according to any one of claims 1 or 2 wherein the temperature of the cellulose solution during extrusion is in the range of 80° C. to 120° C.

10. Process according to claim 9 wherein the temperature of the cellulose solution during extrusion is in the range of 85° C. to 95° C.

11. Process according to any one of claims 1 or 2 wherein the extrusion nozzle has an extrusion gap with a width in the range of 50 μm to 2000 μm.

12. Process according to any one of claims 1 or 2 wherein the film is conveyed out of the precipitation bath and washed whereby the film is prevented from shrinking.

13. Process according to any one of claims 1 or 2 or 2 wherein the tertiary amine oxide is N-methylmorpholine-N-oxide.

14. Process according to any one of claims 1 or further comprising washing and drying the film whereby the film is prevented from shrinking.

15. Process according to any one of claims 1 or 2 further comprising controlling the permeability of the membrane by controlling the speed at which the solution formed in the form of a film is drawn off in the air gap.

16. Process according to any one of claims 1 or 2 further comprising controlling the permeability of the membrane by transverse stretching of the solution shaped in the form of a film.

17. Process according to any one of claims 1 or 2 wherein the solution shaped in the form of a film is stretched in the air gap in the extrusion direction and transverse to the extrusion direction.

* * * * *

UNITED STATES PATENT AND TRADEMARK OFFICE
CERTIFICATE OF CORRECTION

PATENT NO. : 6,177,035 B1
DATED : January 23, 2001
INVENTOR(S) : Schlossnikl et al.

It is certified that error appears in the above-identified patent and that said Letters Patent is hereby corrected as shown below:

Title page,
Item [54] Title, "CELLULOSE SHAPED" should read -- SHAPED CELLULOSE --

Column 15,
Line 41, "oxide conveying" should read -- oxide ¶conveying --

Column 16,
Lines 1, 6, 9, 12, 15, 19, 25, 28, 34, 37, 41, and 45, "any" should read -- either
Line 31, "1 or 2 or 2" should read -- 1 or 2 --
Line 34, "1 or" should read -- 1 or 2 --

"CELLULOSE SHAPED" should read -- SHAPED CELLULOSE --

Column 14,
Line 67, "stretch" should read -- stretched --

Signed and Sealed this

Fourth Day of December, 2001

*Attest:*

Nicholas P. Godici

NICHOLAS P. GODICI
*Acting Director of the United States Patent and Trademark Office*

*Attesting Officer*